(12) United States Patent
Grass et al.

(10) Patent No.: US 7,225,168 B2
(45) Date of Patent: May 29, 2007

(54) METHOD AND SYSTEM FOR PROVIDING A SERVICE ON DEMAND

(75) Inventors: Norbert Grass, Herzogenaurach (DE); Georg Meszaros, Graz (AT); Erich Niedermayr, Vaterstetten (DE); Theodor Rosch, Oberotterbach (DE); Klaus Ruiner, Hainburg (DE); Patrik Schoenenberger, Gossau SG (CH); Matthias Seifert, Buchholz (DE); Hans-Georg Völk, Heppenheim (DE); Gerhard Weller, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 57 days.

(21) Appl. No.: 11/136,637

(22) Filed: May 24, 2005

(65) Prior Publication Data
US 2006/0271495 A1 Nov. 30, 2006

(51) Int. Cl.
*G06Q 99/00* (2006.01)
(52) U.S. Cl. .............................. 705/64; 705/50; 705/51
(58) Field of Classification Search ................ 705/64, 705/50, 51
See application file for complete search history.

(56) References Cited

U.S. PATENT DOCUMENTS

2003/0172002 A1* 9/2003 Spira et al. .................... 705/27
2003/0191709 A1* 10/2003 Elston et al. .................. 705/40

FOREIGN PATENT DOCUMENTS

JP 2003187138 A * 7/2003

* cited by examiner

*Primary Examiner*—Elisca Pierre Eddy

(57) ABSTRACT

The present invention provides an efficient and simple method and system for providing a customer with a service on demand.

The invention is based on providing a plurality of interconnected technical devices with remote access. During operation of a technical installation including the technical devices, operating data are acquired, encrypted and stored in a operation database. Upon an explicit service request by the customer, at least one of the technical devices sets up a remote connection to a service center, preferably by using a smart card including Public Key Infrastructure (PKI) data for validating the smart card, where the remote connection is verified and the encrypted data stored in the operation database are read out and decrypted. Based on the decrypted data—which represent a current status of the technical installation—, a service activity is efficiently performed at the technical installation, either remotely or locally.

17 Claims, 2 Drawing Sheets

METHOD AND SYSTEM FOR PROVIDING A SERVICE ON DEMAND

FIELD OF THE INVENTION

The present invention relates to a method and a system for providing a service on demand.

BACKGROUND OF THE INVENTION

For many customers, purchasing sophisticated technical equipment like production machinery, industrial plants, turbines, generators, passenger trains, vehicles, home entertainment devices and many more, an important aspect of their purchase decision is the availability of a reliable, efficient and cost-effective after-sales service. Modem technology often requires highly specialized and educated service providers. So more and more manufacturers put much effort in offering after-sales services and many independent service providers are competing with them.

When a customer's technical equipment needs service, he or she usually requests a service activity, for example a regular maintenance procedure or a fault repair, from a service provider. Such service activities are often subject to a service contract between the customer and the service provider.

SUMMARY OF THE INVENTION

Many service contracts cover a long time period including regular preventive maintenance work normally scheduled at fixed intervals. On the one hand, such a service contract provides the customer with a high level of confidence as his technical installation is regularly inspected and upcoming faults are hopefully detected early.

On the other hand, such service contracts usually require a considerable financial investment by the customer even if the technical installation runs smoothly. So many customers tend to request a service activity only "on demand", that means only if there actually is a need for repair or maintenance work to assure continuous operation of his technical installation. One important aspect is to determine "the right time" for issuing the service request: not too early to avoid unnecessary interruption of operation, but also not too late to avoid damage to the installation's components. Another important aspect is choosing a qualified service provider who is capable of efficiently handling the service request. As the service provider for a service on demand does not deal with the customer's technical installation on a regular basis, he is usually not familiar with the condition and status of the technical installation at the time of issuance of the service request.

It is therefore an object of the invention to provide a simple and effective method of providing a service on demand. This object is achieved by the claims.

One aspect of the invention thus involves a concept of preparing a plurality of technical devices, which shall form part of the technical installation, for the event of a later service activity where a operation history of the installation is required to ensure a precise identification of underlying problems and thus fast and cost efficient error handling. This aim can be achieved by equipping the technical devices with a configuration management function, a performance management function, an error log function, or a remote access function.

The configuration management function includes a central tool where a technical device's components are listed together with their interconnections, parameter settings and other technical information. So the configuration management function is always up to date with regard to the technical device's current configuration, and the service provider may turn to make use of that valuable information.

The performance management function includes storing the history of important operation parameters of the installation such as efficiency, output, use of resources and so on. The variation in time of such parameters (and therefore a change of performance of the technical installation) is often an important indicator of a need for service of at least one technical device respectively a component of the technical installation which is monitored by the technical device. Thus, the service provider may also turn to make use of that valuable information.

The error log function includes an archive for storing all kinds of error messages originating from installation components during operation of the technical installation. So at any given point in time, referring to the error log may help the service provider to determine an accurate and precise status of the technical installation.

The remote access function allows for reading out data acquired by and stored in the technical devices over a long distance, preferably using the internet. As the technical devices are themselves important productive components of the technical installation or they are at least configured to monitor important components of the technical installation by acquiring operating parameters of those components, the remote access function enables the service provide to read out the operating parameters remotely. So he can assess the installation's status without sending a service technician to the physical location of the installation. Furthermore, a service technician's delegation to the installation can be better prepared based on the read out operating parameters which reflect the installation's status. Alternatively or in combination, the remote access can also be used to provide the customer with a service activity such as a software program update, optimizing a control program, re-starting a control system, executing an operation command and so on.

A further aspect provides for encrypting the acquired operating parameters. The supplier of the technical devices who is also the (future) service provider shall exclusively have access to the operating data by disposing of the related decrypting means such as a software decryption key. So in case of a service request by the customer during a later operation of the technical installation, the service provider can easily assess the current status of the installation at the time of the service request by setting up a remote connection to the installation (i.e. to at least one of the technical devices enabled to be accessed remotely) and reading out and decrypting the stored operating parameters. On the basis of such parameters, which reflect the current status of the installation, the service provider can both efficiently and cost effectively provide an optimized service activity such as repair or maintenance work specific to a component of the installation in need of service. This is only true if the initial supplier of the technical devices is identical to the service provider according to the invention. Technical devices include all types of computerized equipment capable of acquiring operating parameters originating from the installations' components. The components themselves may include the technical devices, for example a turbine unit having a monitoring and control unit assigned to the turbine. The sensors arranged at the components necessary for acquiring the operating parameters may be assigned to the technical device or to the component. Alternatively or in combination, the operating parameters include derived values calculated by a control unit such as an efficiency based on operating parameters.

In a case a service provider other than the initial supplier of the technical devices is instructed to provide a service activity to a component and/or technical device of the installation, assessing the current status of the installation will be a much more complex task as he has no access to the stored and encrypted history of operating parameters. Therefore, the initial service provider is in most cases—according to the invention—enabled to provide a service activity at a lower price because of his reduced effort to assess the current status.

The initial supplier may also consider selling the decrypted history of operating parameters to a third party such as another service provider in charge of servicing the installation. Such a sale can include decrypting the stored operating parameters and selling the decrypted information and/or selling a decryption key and/or licensing a decryption key.

Another aspect of the invention includes using a smart card configured to be connected to at least one of the supplied technical devices. The smart card provides for authorizing the service request, for example by checking Public Key Infrastructure data stored on the smart card by the technical device and/or the service provider after establishing the remote connection. Furthermore, the service request can be issued by the customer by connecting the smart card to the technical device, for example by plugging it into a standard interface slot of the technical device, and setting up the remote connection from service center to the technical device can be triggered by connecting the smart card to the technical device. The technical device then sends a connectivity request to the service center, the service center validates the smart card—for example by verifying the Public Key Infrastructure data stored on the smart card—and establishes the remote connection.

Additional information may be stored on the smart card or be included in the Public Key Infrastructure data. For example, a customer has bought the technical devices including a commitment of the supplier to provide a requested service within a specified period of time, e.g. 12 hours. So the additional data can include those contractual details, and if the customer connects the smart card to the technical device to request a service, the service provider reads out the additional data when or after establishing the remote connection and is immediately aware of his duties and can schedule his activities accordingly.

Yet another aspect of the invention relates to automatically establishing the remote connecting by the technical device if a need for a service activity is detected based on the stored operating parameters. Such a need is transmitted to the customer by the technical device, for example as a message sent by Email or a simple flashing red light. The customer then has to confirm the request to be actually sent off to the service provider by means of the remote connection.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

Figure 1:
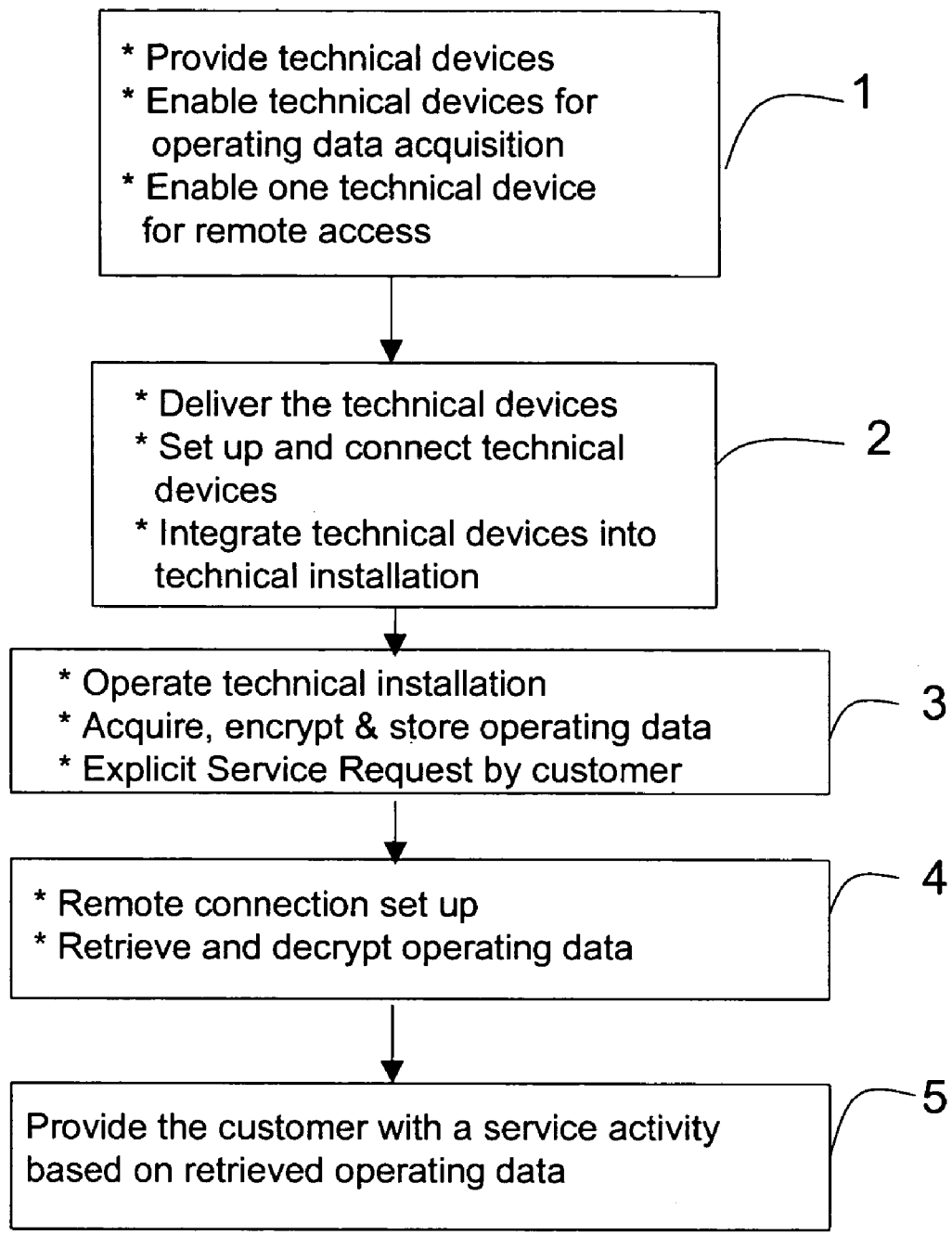
FIG. 1 is a flowchart of an exemplary process of the present invention showing an exemplary series of steps of providing a customer with a service.

The disclosed invention advantageously employs one or more base concepts.

It basically provides an efficient and simple method of providing a customer with a service on demand.

The service may include any kind of services, for example regular maintenance, emergency repair, delivery and installation of spare parts, optimization, operation etc. But also non-technical services shall be covered by the term "service" such as entertainment, medical diagnosis and treatment, delivery of ordered items like food and/or consumer goods.

Preferably, the customer's technical installation comprises at least one computer and that computer can be provided with the service online using an internet connection. In such case, the service can for example include software error handling, updating, optimizing and installation of software programs.

One concept is enabling the technical devices upfront to be accessed remotely. Thus, the devices are pre-prepared for a future "service event" using a remote connection.

Another concept involves acquiring and storing operational data including operational parameters representative for the technical installation's condition/status during operation of the installation by at least one technical device. Such a history of operational data imprint the timely history of operation of the installation in the operation database and allow for an efficient analysis of what is or was going on with the installation in order to determine a service need.

Yet another concept provides decrypting the operational data upon storage for an exclusive access by the supplier of the technical devices (who is later also the prospective service provider). Exclusive access to such encrypted data is an enormous advantage for the supplier in order to provide a cost efficient after sales service on demand. Only the supplier has the decryption means to decrypt the stored operating parameters and thus can make use of them for planning, quoting and executing the requested service activity.

A further preferred concept includes utilizing a smart card for triggering the establishment of a remote connection between the service center of the service provider and the technical device to which the smart card is connected. The smart card may include Public Key Infrastructure data for validating the technical device or the technical installation associated with the technical device. It can further include the encryption means for encrypting the operating data. Preferably, the customer issues and therefore authorizes the service request by plugging the smart card into the respective technical device.

All the embodiments to be described in more detail in the following can be applied to providing technical and non-technical services to all kinds of customers. The services preferably include technical activities performed on facilities such as industrial plants, hotels, production machinery, turbines, generators, passenger trains, vehicles, home entertainment devices, but shall not be limited to any special purpose.

FIG. 1 depicts a flowchart of an exemplary process of the present invention showing an exemplary series of steps of providing a customer with a service on demand.

Step 1 involves a plurality of sub-steps related to an upfront enabling of the technical devices for the prospective on demand service request: Providing the technical devices, enabling the technical devices for acquiring operating parameters during an operation of the installation, and configuring at least one technical device to be accessed remotely. The remote access function allows for reading out data acquired by and stored in the technical devices over a long distance, preferably using the internet.

Step 2 depicts a group of steps related to setting up the technical installation at the customer's facilities: Delivering the technical devices, setting up and interconnecting the devices, and integrating the devices into the technical installation.

Step 3 describes the operating phase of the installation including acquiring, encrypting and storing the operating parameters, and requesting a service by the customer. Such a service on demand may be requested after the customer has been made aware of any defect, malfunction or under performance of his technical installation, for example by manually evaluating a computer log or by automatically being alarmed by one of the technical devices. The service request is then explicitly requested by the customer for example by calling the service provider, sending an Email or by directly triggering the technical device to connect to the service provider over the internet. Such a triggering can be accomplished by a smart card inserted into a slot of the technical device by the customer.

Step 4 depicts setting up the remote connection between the technical device and the service provider's service center, and retrieving the decrypted operating data by the service provider. The decrypted operating data are an enormously valuable source of information concerning the current condition/status of the customer's technical installation at the time of the service request serving as a memory map of the installation. Based on that information, the service provider analysis the status of the installation and decides on which service activity is necessary to be performed on the installation. Compared to other service providers not capable of retrieving that encrypted information, the service provider saves an enormous amount of time necessary for assessing the installation's condition. Furthermore, the decrypted information also enhances adequacy of the proposed service activity.

Step 5 finally provides performing the service activity based on the service request and the decrypted operating data. The service activity may be performed remotely using the remote connection and include a software program update, optimizing a control program, re-starting a control system, or executing an operation command. Alternatively or in combination, the service activity can be planned at the service center, but be performed locally at the technical installation by a service technician. Such a service activity usually includes machinery repair and maintenance work which is not feasible remotely. But it is also possible that even those "old economy" service activities can be executed remotely, provided there is a remotely accessible actuator or robot available at the installation to perform such work.

Figure 2:
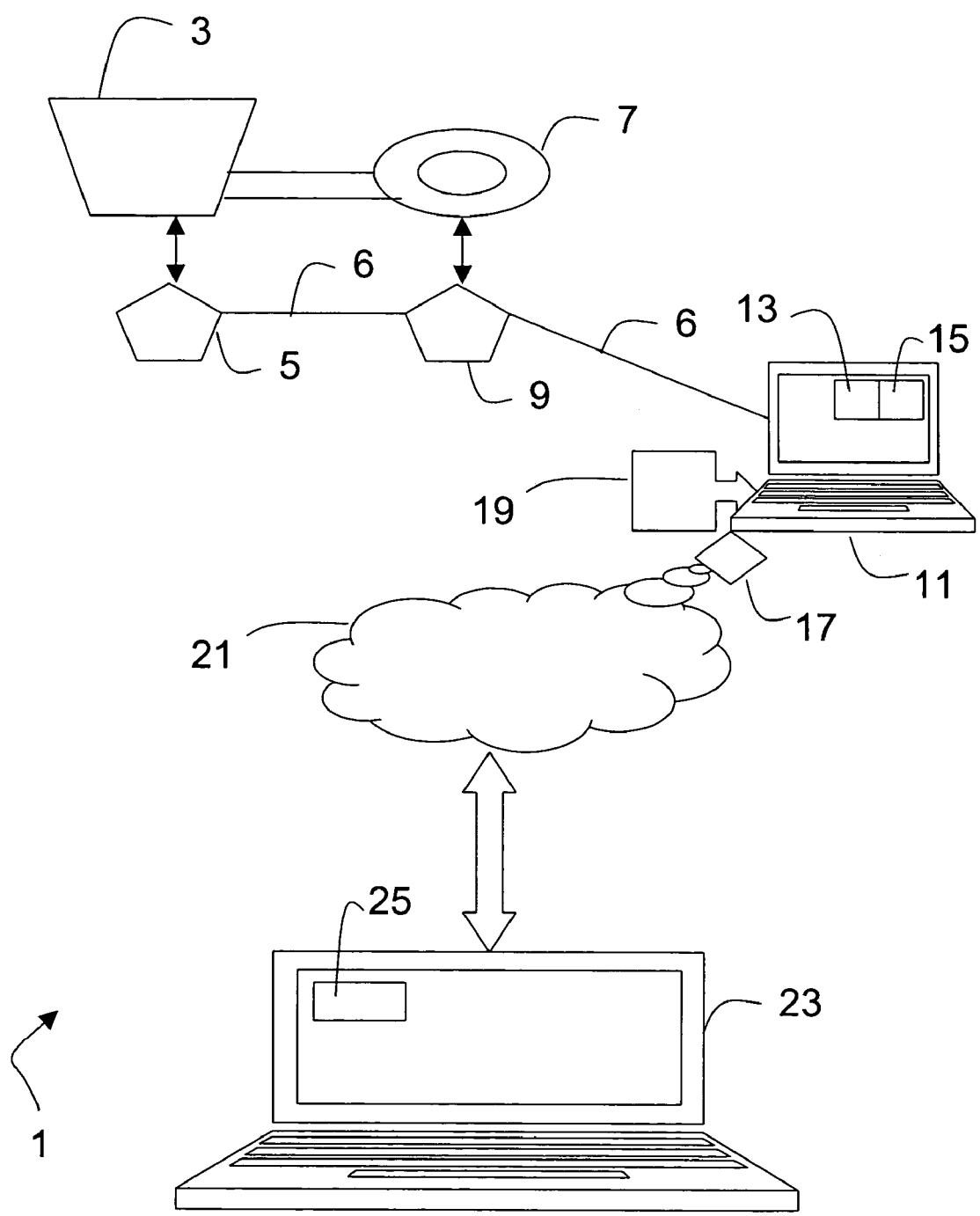
FIG. 2 is a schematic diagram of a computer system adapted to enable an embodiment of the invention.

FIG. 2 shows a schematic diagram of a computer system adapted to enable an embodiment of the invention.

A power plant 1 is operated by a customer and includes as core components a turbine 3 and a generator 7. Technical devices embodied as a turbine monitoring and control unit 5 and a generator monitoring and control unit 9 are operatively connected to the turbine 3 respectively the generator 7 for acquiring operational parameters such as revolutions per minute, power output, winding temperatures, load signals, alarm signals, cooling medium pressure and discharge, fuel discharge and pressure and so on.

The turbine monitoring and control unit 5 and the generator monitoring and control unit 9 are connected by a communication bus system 6, for example by a fiber optic, for data interchange.

A further technical device embodied as a central control computer 11 is also connected to the communication bus system 6 and to the internet 21 using a remote access interface 17. All data acquired by the turbine monitoring and control unit 5 and the generator monitoring and control unit 9, including the operating parameters related to and originating from the turbine 3 and the generator 7, are also accessible by the central control computer 11 using the communication bus system 6. The central control computer 11 includes an operating data base 15 for storing and an encryption device 13 for encrypting the operating data.

A smart card 19 is configured to be operatively connected to the central control computer. Plugging the smart card 19 into the central control computer 11 by the customer authorizes a service request and triggers establishing a remote connection between the technical installation and a service center computer 23 of the service provider via the internet 21. For validating purposes, the smart 19 can include Public Key Infrastructure data.

The service provider retrieves the stored and encrypted operating parameters from the operating database 15 via the internet. Assessing the current status of the power plant 1 includes decrypting 25 the retrieved operating parameters to form a operating history of the power plant 1. Based on such information, the service provider effectively determines adequate measures to be performed as a service activity at the power plant 1. As long as such a service activity can be accomplished remotely, for example a software update or a software error debugging procedure, the service provider may use his remote service computer 23 to access the target technical device, for example the turbine control and monitoring unit 5, over the internet 21.

If the service activity actually requires a service technician to be sent to the physical location of the power plant 1, the invention nevertheless provides for an advantage as assessment of the power plant's 1 status and condition need not be done locally but can be performed in advance remotely thus enabling a highly efficient assignment of the service technician who can focus on the previously identified problems.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

For example, the ordering of method steps is not necessarily fixed, but may be capable of being modified without departing from the scope and spirit of the present invention.

What is claimed is:

1. A method of providing a customer with a service by a service provider, comprising:

providing a plurality of technical devices, the plurality of technical devices configured to be interconnected to form at least part of a technical installation;

enabling the plurality of technical devices to acquire operating data of the technical installation;

enabling at least one of the plurality of technical devices to be accessed remotely;

providing the customer with the plurality of technical devices;

setting up and interconnecting the plurality of technical devices;

operating the technical installation including the plurality of technical devices;

acquiring the operating data of the technical installation by the plurality of technical devices during operation of the technical installation;

encrypting the acquired operating data and storing the encrypted operating data in an operation database assigned to at least one of the plurality of technical devices, wherein only the service provider has exclusive access to the stored encrypted operating data by applying a decryption key for decrypting the stored encrypted operating data;

requesting a service activity related to at least one component of the technical installation by the customer;

setting up a remote connection between a service center to the at least one of the plurality of technical device enabled to be accessed remotely, retrieving at least part of the encrypted operating data from the operation database;

decrypting the retrieved operating data by the service provider using the decryption key, and providing the customer with the service activity based on the decrypted operating data.

2. The method according to claim 1, further comprising providing the customer with a smart card configured to be connected to the at least one technical device enabled to be accessed remotely, the smart card configured to set up the remote connection.

3. The method according to claim 2, wherein the smart card includes Public Key Infrastructure (PKI) data for validating the smart card.

4. The method according to claim 3, wherein
the service activity is requested by connecting the smart card to the at least one technical device enabled to be accessed remotely, and
the smart card is validated before setting up the remote connection based on the Public Key Infrastructure data.

5. The method according to claim 4, wherein the remote connection includes transmitting the Public Key Infrastructure data, and the service provider identifies the technical installation based on the Public Key Infrastructure data.

6. The method according to claim 1, wherein the service activity is provided using the remote connection.

7. The method according to claim 1, wherein the service activity is provided at the physical location of the technical installation.

8. The method according to claim 1, wherein the stored operating data are decrypted and sold to a further service provider, the further service provider providing the service activity.

9. The method according to claim 1, wherein at least one of the plurality of technical devices includes an element chosen from the group consisting of a configuration management function, a performance management function and an error log function.

10. The method according to claim 1, wherein at least one of the plurality of technical devices includes a diagnosis function for automatically detecting a service demand of the technical installation.

11. The method according to claim 10, wherein the detected service demand is transmitted to the customer, authorized by the customer and transmitted to the service provider as the requested service activity.

12. A system for providing a customer with a service by a service provider, comprising:

a plurality of technical devices configured to be interconnected to form at least part of a technical installation assigned to the customer, an data acquisition unit for acquiring operating data of the technical installation during operation of the technical installation;

an encryption device for encrypting the acquired operating data;

an operation database for storing the encrypted operating data;

a remote access device for reading out and transmitting at least part of the stored encrypted operating data;

an input device for inputting a service activity request by the customer, a smart card configured to be connected to at least one of the plurality of technical devices and configured to set up a remote connection to a remote service center computer upon the inputted service activity request, the smart card including Public Key Infrastructure (PKI) data for validating the smart card; and a decryption device having a decryption key and assigned to the remote service center computer for decryng the read out and transmitted operating data, wherein only the service provider has exclusive access to the stored encrypted operating data by applying the decryption key for decrypting the stored encrypted operating data.

13. The system according to claim 12, wherein a service activity based on the service activity request and the decrypted operating data is executed remotely at the customer's technical installation by the remote service center computer using the remote connection.

14. The system according to claim 12, wherein a service activity based on the service activity request and the decrypted operating data is executed locally at the customer's technical installation by a service technician.

15. The system according to claim 12, wherein at least one of the plurality of technical devices includes an element chosen from the group consisting of a configuration management function, a performance management function and an error log function.

16. The system according to claim 12, wherein at least one of the plurality of technical devices includes a diagnosis function for automatically detecting a service demand of the technical installation.

17. The system according to claim 16, wherein the detected service demand is transmitted to the customer, authorized by the customer and transmitted to the remote service center computer as the requested service activity.

* * * * *